June 8, 1937.  J. LOESER  2,083,461
TIRE
Filed March 21, 1936

John Loeser,
INVENTOR

BY Victor J. Evans & Co.
ATTORNEY

WITNESS

Patented June 8, 1937

2,083,461

UNITED STATES PATENT OFFICE 2,083,461

TIRE

John Loeser, Philadelphia, Pa.

Application March 21, 1936, Serial No. 70,123

1 Claim. (Cl. 152—8)

This invention relates to tires for motor vehicles and has for the primary object the provision of a device of this character which will provide efficient service and reduce skidding to a minimum.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a tire constructed in accordance with my invention.

Figure 1:
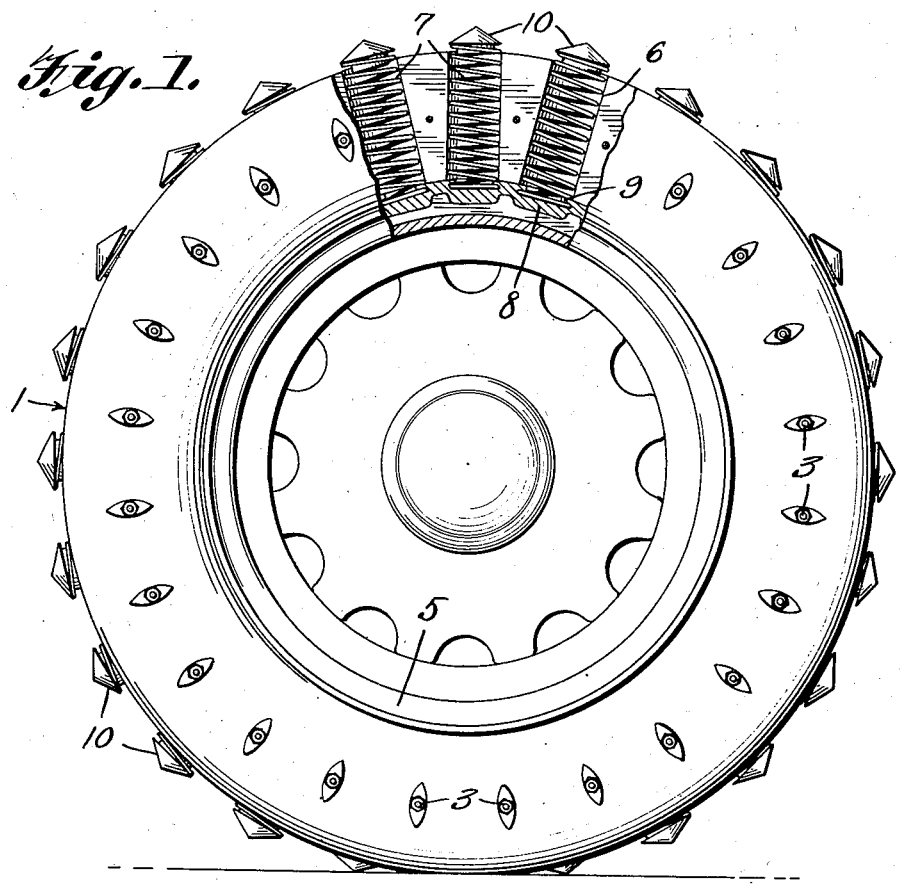
Figure 2:
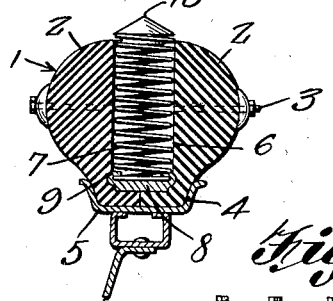
Figure 2 is a transverse sectional view illustrating the same.
Figure 3:
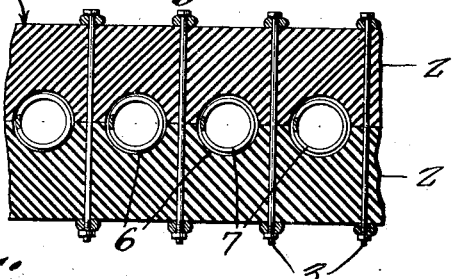
Figure 3 is a fragmentary longitudinal sectional view showing the construction of the tire body and the spring means for the yieldable calks.

Referring in detail to the drawing, the numeral 1 indicates the body of a tire composed of companion annular sections 2 detachably connected by tie bolts 3. The body 1 is equipped with the usual rim engaging portions 4 so that the body may be mounted on a rim, as shown at 5. Formed in the opposing faces of the annular sections 2 are relatively spaced recesses opening outwardly through the tread of the body. When the annular sections 2 are assembled, the recesses are matched in pairs to form chambers 6 in which are located coil springs 7. The chambers are in communication to permit passing through said chambers an annular band 8 having formed thereon flanges cooperating with the band in forming in the chambers spring seats to receive the inner ends of the coil springs, the flanges 9 overlying and engaging with certain convolutions of the springs so that said springs will be anchored in the chambers. Secured to the springs and protruding out of the chambers are calks 10 each including a conical-shaped portion to facilitate the calks biting into the ground, snow or ice. However, when the calks engage with a hard surface the springs 7 will yield permitting the pointed ends of the calks to become flush with the tread of the body. The body is preferably constructed of rubber or any other material suitable for the purpose while the calks are made of steel or some other suitable material.

Figure 4:
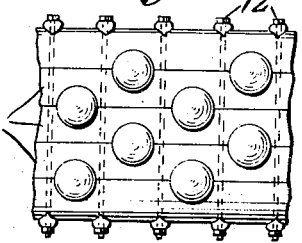
Figure 4 is a fragmentary plan view illustrating a modified form of my invention.

The body may be constructed of a series of annular sections 11, as shown in Figure 4, the sections 11 being joined together by tie bolts 12 and are equipped with chambers to receive the calks and the springs heretofore referred to.

Having described the invention, I claim:

A tire comprising a body of sectional formation each section being of annular form, tie means connecting the sections, said sections being recessed to form chambers opening outwardly through the tread of the body, pointed calks protruding beyond the tread of the body, coil springs mounted in the chambers and secured to the calks, an annular band traversing the chambers and confined in the body, and flanges formed on said band and cooperating therewith in providing anchorage for said springs.

JOHN LOESER.